(12) United States Patent
Omure et al.

(10) Patent No.: US 6,187,219 B1
(45) Date of Patent: Feb. 13, 2001

(54) REFRIGERATOR AND DIFLUOROMETHANE/PENTAFLUOROETHANE/1,1,1,2-TETRAFLUOROETHANE WORKING FLUID

(75) Inventors: Yukio Omure; Masahiro Noguchi; Katsuki Fujiwara, all of Settsu (JP)

(73) Assignee: Daikin Industries, Ltd. (JP)

( * ) Notice: Under 35 U.S.C. 154(b), the term of this patent shall be extended for 0 days.

(21) Appl. No.: 09/228,654

(22) Filed: Jan. 12, 1999

Related U.S. Application Data

(62) Division of application No. 08/934,208, filed on Sep. 19, 1997, which is a division of application No. 08/270,576, filed on Jul. 5, 1994, which is a division of application No. 07/994,074, filed on Dec. 16, 1992, now abandoned, which is a continuation of application No. 07/680,251, filed on Apr. 4, 1991, now abandoned.

(30) Foreign Application Priority Data

Apr. 4, 1990 (JP) .................................................. 2-90775

(51) Int. Cl.[7] ................................................. C09K 5/04
(52) U.S. Cl. .............................................. 252/67; 62/114
(58) Field of Search ................................ 252/67; 62/114, 62/498, 502

(56) References Cited

U.S. PATENT DOCUMENTS

| | | | |
|---|---|---|---|
| 4,810,403 | * 3/1989 | Bivens et al. | 252/67 |
| 4,971,712 | * 11/1990 | Gorski et al. | 252/68 |
| 5,185,094 | * 2/1993 | Shiflett | 252/67 |
| 5,370,811 | * 12/1994 | Yoshida et al. | 252/67 |
| 5,438,849 | * 8/1995 | Yoshida et al. | 62/498 |
| 5,643,492 | * 7/1997 | Shiflett | 252/67 |
| 5,709,092 | * 1/1998 | Shiflett | 62/114 |
| 5,722,256 | * 3/1998 | Shiflett | 62/502 |

* cited by examiner

*Primary Examiner*—Margaret Einsmann
(74) *Attorney, Agent, or Firm*—Larson & Taylor, PLC

(57) ABSTRACT

The invention provides a refrigerant comprising a mixture of three compounds selected from the group consisting of hydrofluorocarbons represented by the formula $$C_l H_m F_n \qquad (1)$$

wherein when l is 1, m is an integer of 1 or 2, n is an integer of 2 or 3 and m+n=4; when l is 2, m is an integer of 1 to 4, n is an integer of 2 to 5 and m+n=6; and when l is 3, m is an integer of 1 to 3, n is an integer of 5 to 7 and m+n=8.

4 Claims, 5 Drawing Sheets

REFRIGERATOR AND DIFLUOROMETHANE/PENTAFLUOROETHANE/1,1,1,2-TETRAFLUOROETHANE WORKING FLUID

This is a division of application Ser. No. 08/934,208 filed Sept. 19, 1997 allowed; which is a division of Ser. No. 08/270,576 filed Jul. 5, 1994 pending; which is a divisional of U.S. Pat. No. 07/994,074 filed Dec. 16, 1992 (now abandoned); which is a continuation of U.S. Pat. No. 07/680,251, filed Apr. 4, 1991 (now abandoned).

BACKGROUND OF THE INVENTION

The present invention relates to a refrigerant. Hydrochlorofluorocarbons, hydrofluorocarbons, azeotropic compositions thereof and like compositions are known as working fluids or refrigerants. Among them, R-11 (trichlorofluoromethane), R-12 (dichlorodifluoromethane), R-22 (chlorodifluoromethane), etc. have been conventionally used as working fluids for refrigerators. In recent years, however, it has been suggested that some hydrogen-free chlorofluorocarbons, when released into the atmosphere, would deplete the stratospheric ozone layer, thereby inflicting a serious adverse influence on the ecosystem including humans on the earth. In view of the problem, a worldwide agreement calls for the restriction of use and production of major ozone-depleting chlorofluorocarbons. Among the chlorofluorocarbons to be controlled for the restriction are R-11, R-12 and the like all of which are widely used as mentioned above. With the spread of refrigerators and air-conditioning systems, the use and production of these refrigerants are enjoying an annually increasing demand. However, the control over these refrigerants will greatly affect our residential environments and the current social framework as a whole. Consequently, there is an urgent demand for development of a novel refrigerant which has no or little potential to cause the problem of depleting the stratospheric ozone layer.

SUMMARY OF THE INVENTION

An object of the present invention is to provide a novel refrigerant which has excellent properties for use in refrigerators, and which would exert little or no influence on the stratospheric ozone layer, when released into the atmosphere. During the research, we found that when using a mixture of three compounds selected from the group consisting of specific hydrofluorocarbons (hereinafter simply referred to as "HFC"), the contemplated object can be achieved.

According to the present invention, there is provided a refrigerant comprising a mixture of three compounds selected from the group consisting of hydrofluorocarbons represented by the formula $$C_l H_m F_n \quad (1)$$

wherein when l is 1, m is an integer of 1 or 2, n is an integer of 2 or 3 and m+n=4; when l is 2, m is an integer of 1 to 4, n is an integer of 2 to 5 and m+m=6; and when l is 3, m is an integer of 1 to 3, n is an integer of 5 to 7 and m+n=8.

DETAILED DESCRIPTION OF THE INVENTION

Figure 1:
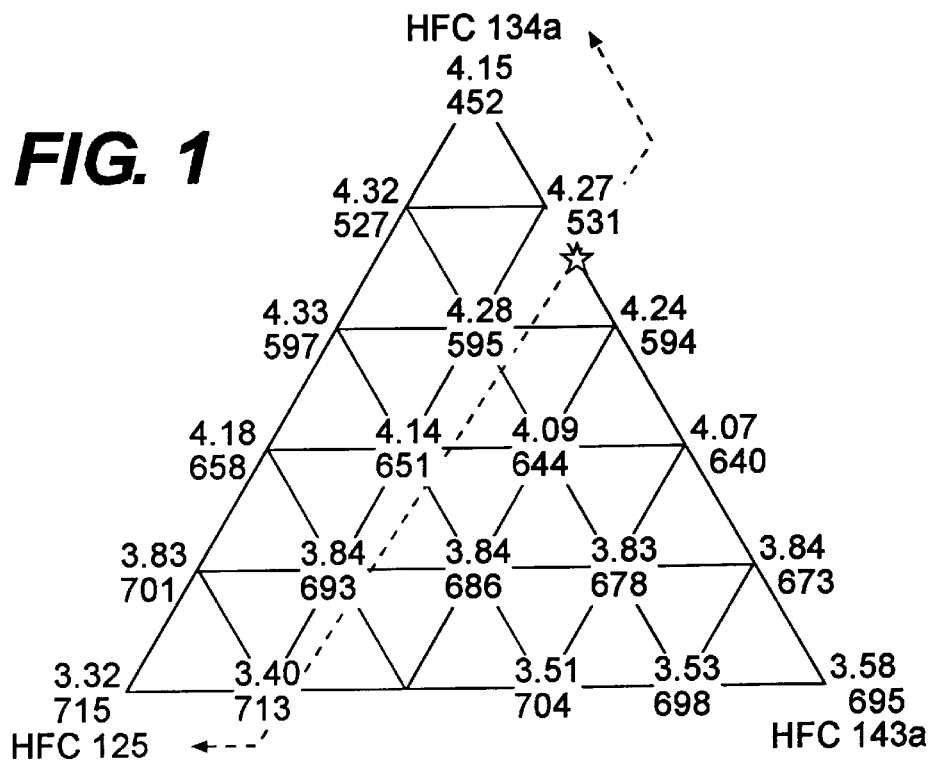
FIGS. 1 to 10 attached hereto are triangular diagrams showing the relationship between the composition of the present refrigerant and the coefficient of performance, and the relationship between the composition of the present refrigerant and the refrigerating capacity.

Listed below are the boiling points of hydrofluorocarbons exemplified as useful in the present invention.

| HFC | Boiling point (° C.) |
| --- | --- |
| 23 | −82 |
| 32 | −52 |
| 41 | −79 |
| 125 | −49 |
| 134 | −20 |
| 134a | −26 |
| 143 | 5 |
| 143a | −48 |
| 152 | 31 |
| 152a | −25 |
| 227ca | −18 |

The proportions of the three compounds represented by the formula (1) in the present refrigerant are not specifically limited. Yet refrigerants desirable for use have a composition in the range in which the refrigerants are nonflammable or flame-retardant. Stated more specifically, the refrigerant is substantially nonflammable when m/m+n<0.5 on the average in the mixture of three compounds represented by the formula (1).

The refrigerant of the invention may be mixed with a stabilizer, when so required. Particularly when a high stability is required under severe conditions, a stabilizer may be used in an amount of about 0.01 to about 5% based on the weight of the refrigerant. Examples of stabilizers useful in the invention are epoxides such as propylene oxide, 1,2-butylene oxide and glycidol; phosphites such as dimethylphosphite, diisopropylphosphite and diphenylphosphite; thiophosphites such as trilauryltrithiophosphite; phosphinesulfides such as triphenoxyphosphinesulfide and trimethylphosphinesulfide; boron compounds such as boric acid, triethyl borate, triphenyl borate, phenylboric acid and diphenylboric acid; phenols such as 2,6-di-tert-butyl-p-cresol; nitroalkanes such as nitromethane and nitroethane; esters of acrylic acids such as methyl acrylate and ethyl acrylate; and other stabilizers such as dioxane, tertbutanol, pentaerythritol and p-isopropenyl toluene.

The refrigerant of the invention may be mixed with other compounds which would not lead to failure to achieve the contemplated objects and results of the invention. Such compounds include, for example, ethers such as dimethyl ether and pentafluorodimethyl ether, amines such as perfluoroethylamine, and LPG.

The refrigerants of the invention are readily decomposed and contain neither chlorine atom nor bromine atom which adversely affects the ozone layer, hence free of the ozone layer depletion problem.

Moreover, the refrigerants of the invention are well balanced in terms of refrigerating capacity, coefficient of performance, temperature of discharged gas and other properties.

Further, since the refrigerants of the invention have a low solubility in polymeric compounds, they can be used in conventional refrigerators without replacement of materials heretofore employed.

Further advantageously the refrigerants of the invention are excellent in thermal stability and nonflammable or flame-retardant, and therefore can be used, as they are, in conventional refrigerators.

Examples are described below to clarify the features of the present invention in more details.

The values arranged in pairs at upper and lower positions in FIGS. 1 to 10 represent the results obtained in Examples. The figure at the upper position designates the coefficient of performance, and the figure at the lower position expresses the refrigerating capacity (kcal/m$^3$).

The pairs of values on each side of the triangular diagrams in FIGS. 1 to 10 show, as references, the results obtained by use of two-component (binary) mixture refrigerants.

The refrigerant having the composition represented by the portion of triangular diagram above the broken line is nonflammable. The nonflammability of refrigerants was evaluated by the following procedure. The mixture was quantitatively determined by a manometer, placed into a globular vessel (about 2 liter in volume) and fully stirred, followed by introduction of air. When the mixture became homogeneous, the generation of sparks was attempted using an ignition device in order to find out whether the mixture of each composition was nonflammable.

EXAMPLE 1

A refrigerator was operated using the ternary mixture refrigerants as shown in the triangular diagram of FIG. 1 under the conditions of a refrigerant-evaporating temperature of 0° C., condensing temperature of 55° C., superheat degree of 5°0 C. and subcool degree of 0° C. in the condenser.

When HCFC 22 widely employed was used under the same conditions, the coefficient of performance was 4.13, and the refrigerating capacity was 716 kcal/m$^3$.

EXAMPLE 2

Figure 2:
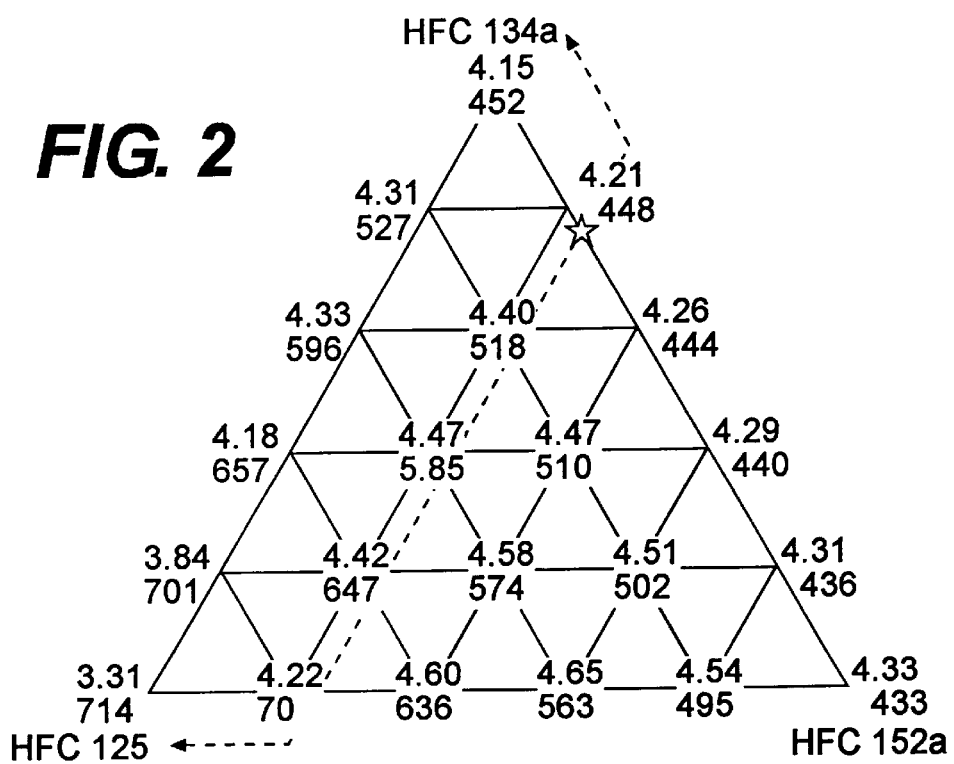

The refrigerator was operated in the same manner as in Example 1 with the exception of using the ternary mixture refrigerants as shown in the triangular diagram of FIG. 2.

FIG. 2 shows the results.

EXAMPLE 3

Figure 3:
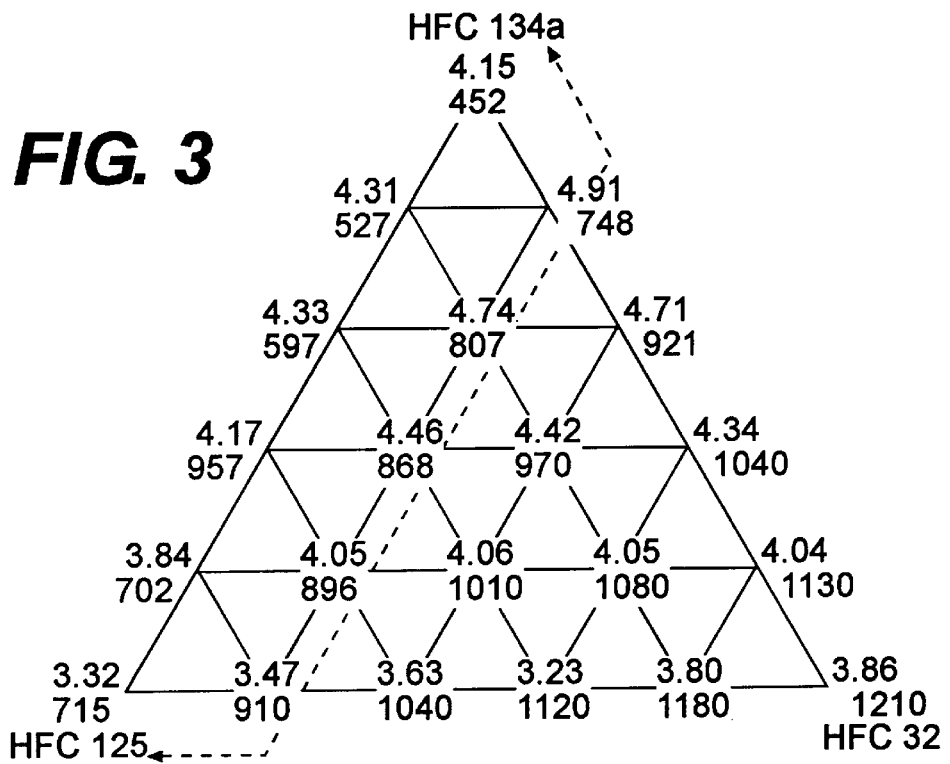

The refrigerator was operated in the same manner as in Example 1 with the exception of using the ternary mixture refrigerants as shown in the triangular diagram of FIG. 3.

FIG. 3 shows the results.

EXAMPLE 4

Figure 4:
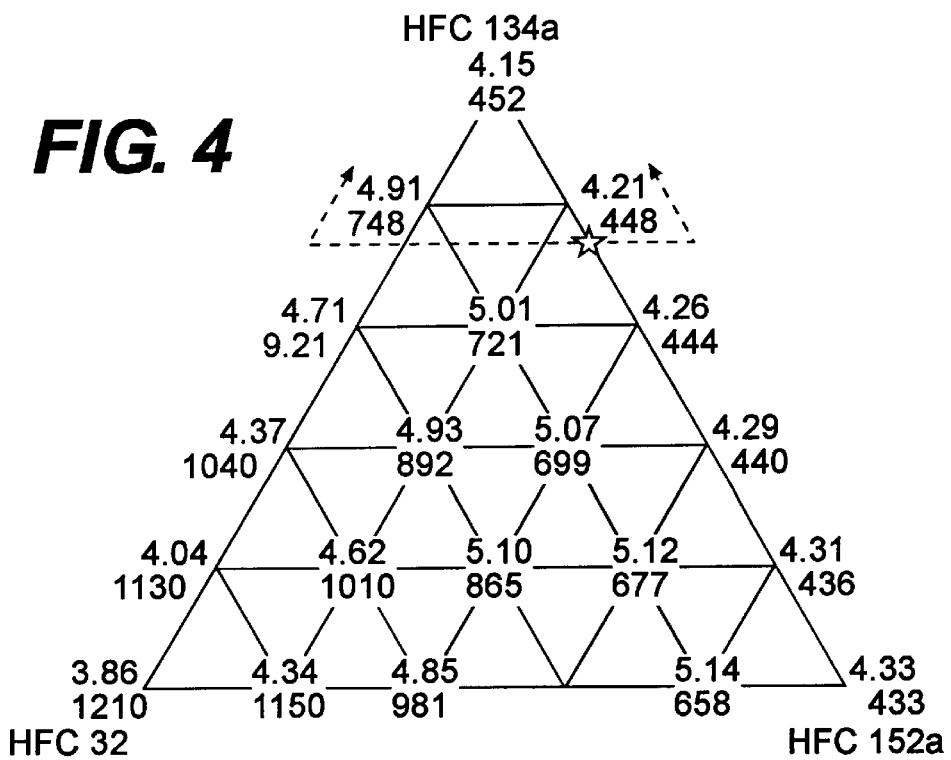

The refrigerator was operated in the same manner as in Example 1 with the exception of using the ternary mixture refrigerants as shown in the triangular diagram of FIG. 4.

FIG. 4 shows the results.

EXAMPLE 5

Figure 5:
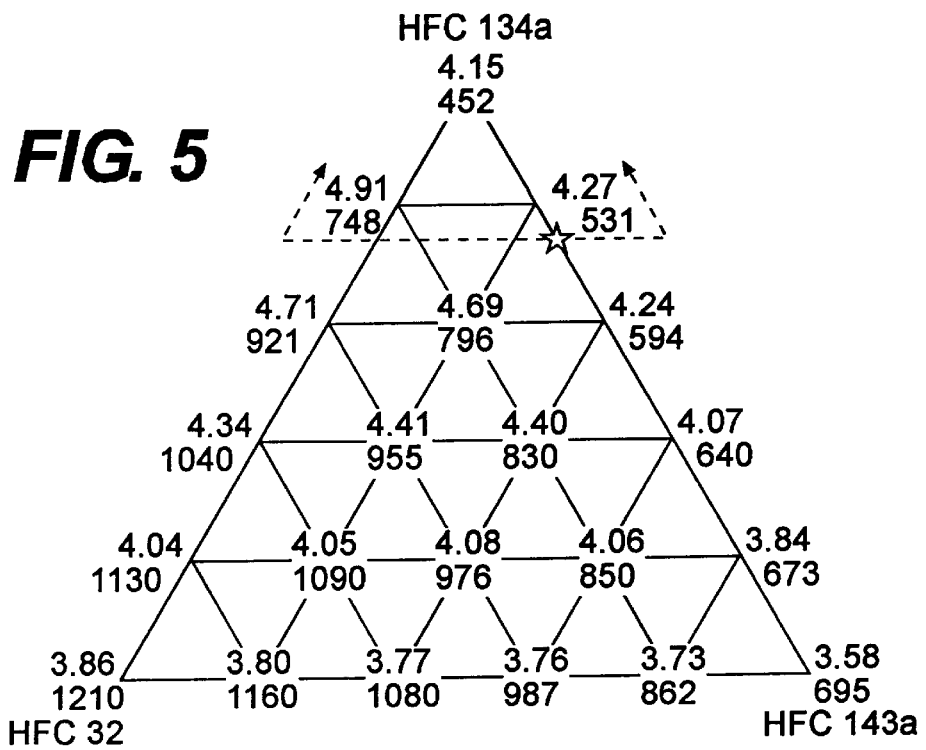

The refrigerator was operated in the same manner as in Example 1 with the exception of using the ternary mixture refrigerants as shown in the triangular diagram of FIG. 5.

FIG. 5 shows the results.

EXAMPLE 6

Figure 6:
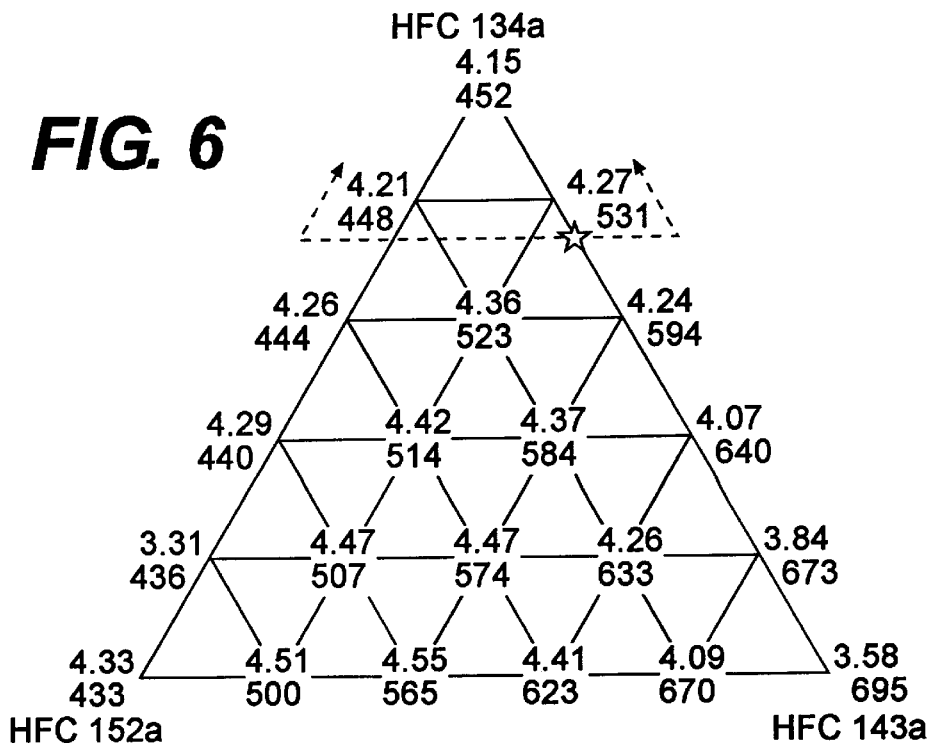

The refrigerator was operated in the same manner as in Example 1 with the exception of using the ternary mixture refrigerants as shown in the triangular diagram of FIG. 6.

FIG. 6 shows the results.

EXAMPLE 7

Figure 7:
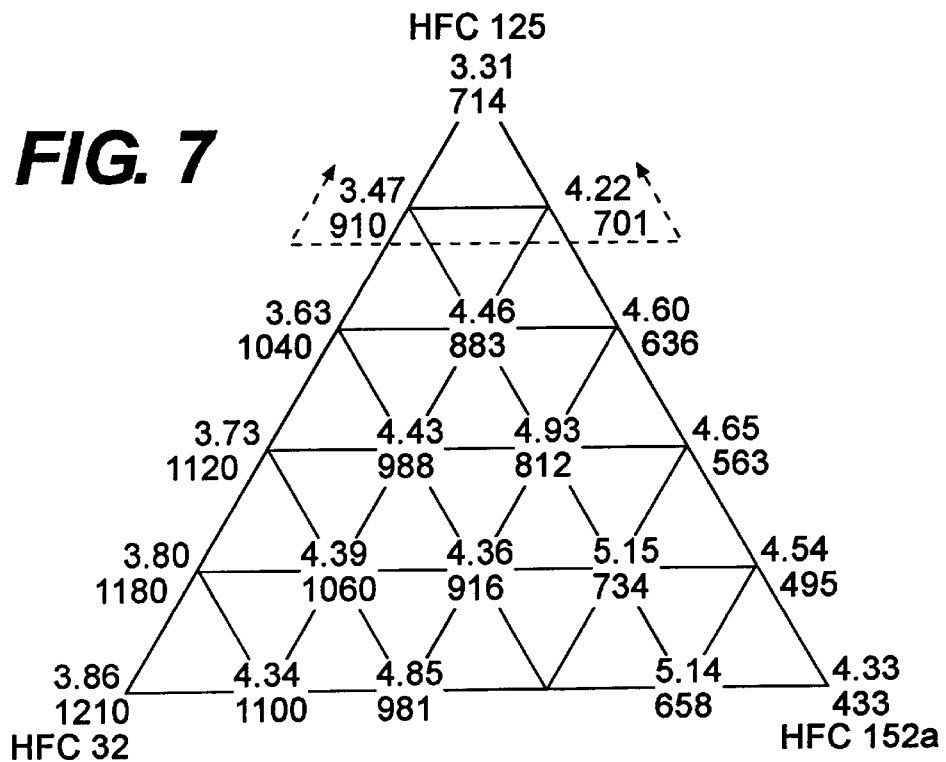

The refrigerator was operated in the same manner as in Example 1 with the exception of using the ternary mixture refrigerants as shown in the triangular diagram of FIG. 7.

FIG. 7 shows the results.

EXAMPLE 8

Figure 8:
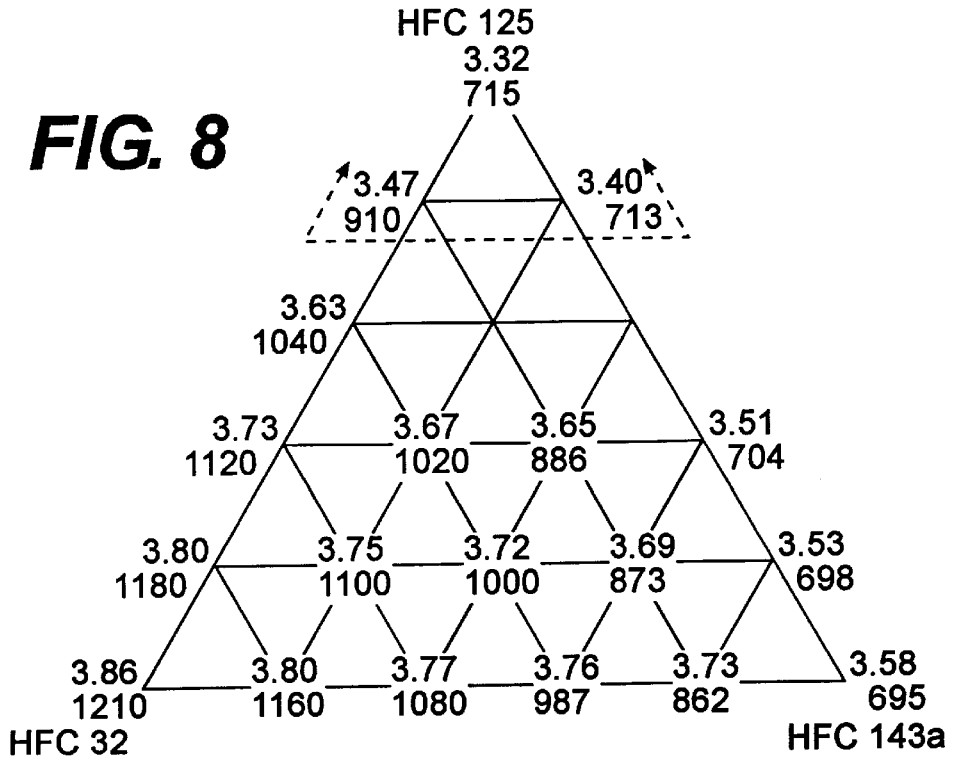

The refrigerator was operated in the same manner as in Example 1 with the exception of using the ternary mixture refrigerants as shown in the triangular diagram of FIG. 8.

FIG. 8 shows the results.

EXAMPLE 9

Figure 9:
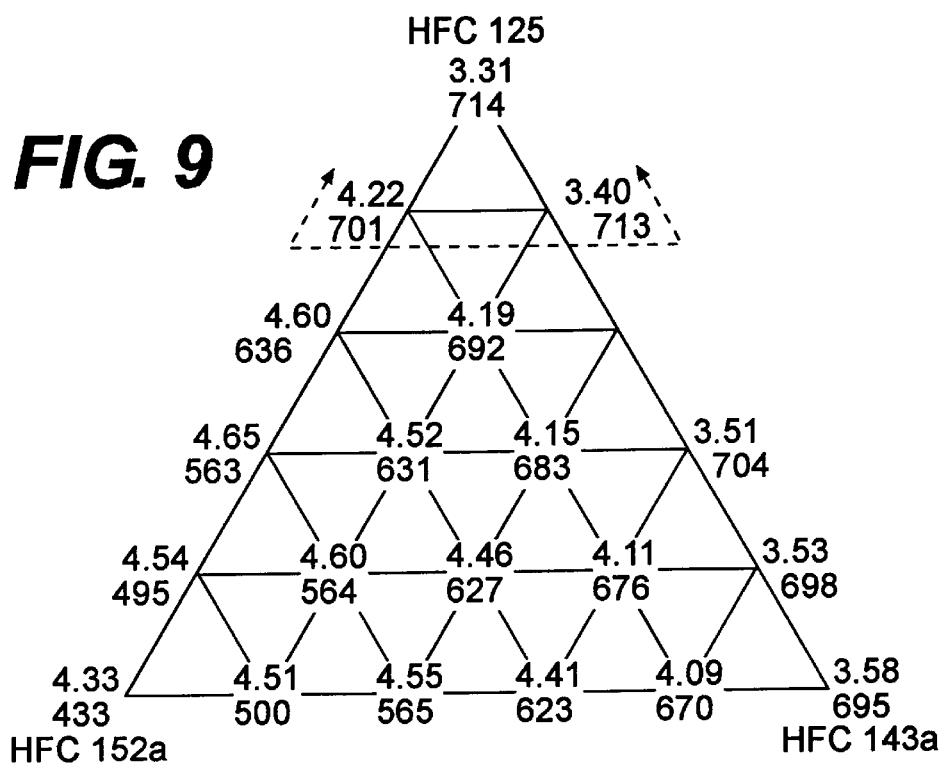

The refrigerator was operated in the same manner as in Example 1 with the exception of using the ternary mixture refrigerants as shown in the triangular diagram of FIG. 9.

FIG. 9 shows the results.

EXAMPLE 10

Figure 10:
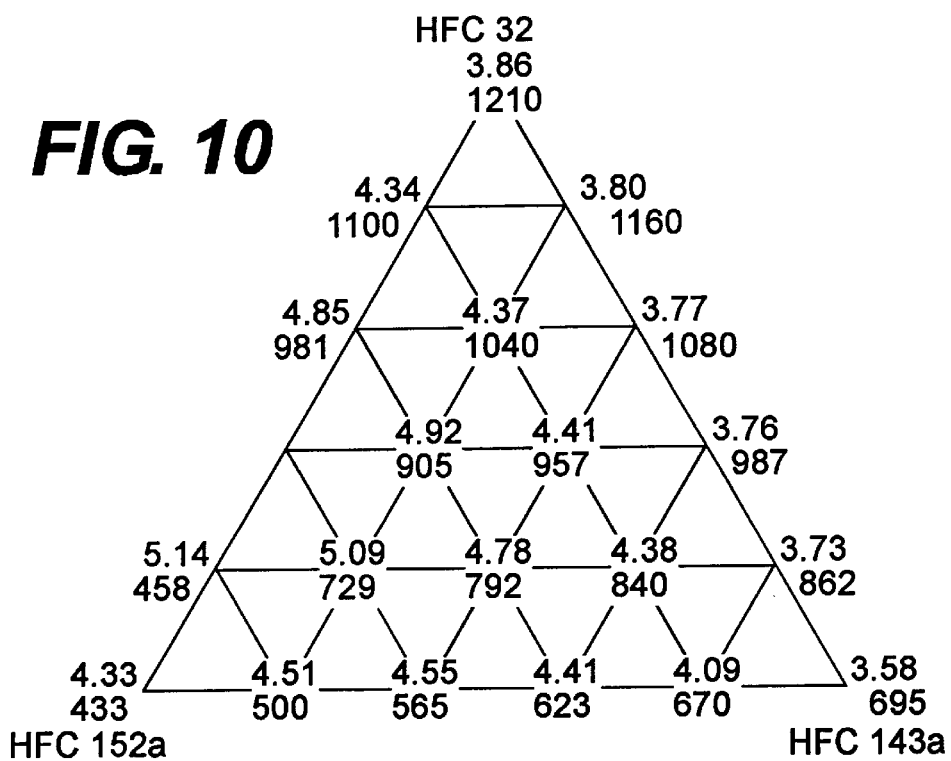

The refrigerator was operated in the same manner as in Example 1 with the exception of using the ternary mixture refrigerants as shown in the triangular diagram of FIG. 10.

FIG. 10 shows the results.

What is claimed is:

1. A composition consisting essentially of difluoromethane, pentafluoroethane and 1,1,1,2-tetrafluoroethane within the area surrounded by the points characterized by a the weight % ratio of difluoromethane/pentafluoroethane/1,1,1,2-tetrafluoroethane (20/20/60), (20/40/40) and (40/20/40).

2. A non-flammable composition consisting essentially of difluoromethane, pentafluoroethane and 1,1,1,2-tetrafluoroethane within the area surrounded by the points characterized by the weight % ratio of difluoromethane/pentafluoroethane/1,1,1,2-tetrafluoroethane (20/20/60), (20/40/40) and (40/20/40).

3. A refrigerator having a condenser and an evaporator and containing a working fluid comprising a composition consisting essentially of difluoromethane, pentafluoroethane and 1,1,1,2-tetrafluoroethane within the area surrounded by the points characterized by the weight % ratio of difluoromethane/pentafluoroethane/1,1,1,2-tetrafluoroethane (20/20/60), (20/40/40) and (40/20/40).

4. A refrigerator having a condenser and an evaporator and containing a working fluid comprising a non-flammable composition consisting essentially of difluoromethane, pentafluoroethane and 1,1,1,2-tetrafluoroethane within the area surrounded by the points characterized by the weight % ratio of difluoromethane/pentafluoroethane/1,1,1,2-tetrafluoroethane (20/20/60), (20/40/40) and (40/20/40).

* * * * *